(12) United States Patent
Krishnasamy et al.

(10) Patent No.: US 12,546,180 B2
(45) Date of Patent: Feb. 10, 2026

(54) BLOWOUT PREVENTER SYSTEMS AND METHODS

(71) Applicant: Schlumberger Technology Corporation, Sugar Land, TX (US)

(72) Inventors: Pandeeswaran Krishnasamy, Kattunaickanpatti (IN); Pranav Shukla, Coimbatore (IN); Prabhu Jagadesan, Sugar Land, TX (US); Sangameshwar Shreekkar, Coimbatore (IN); Arunima Cr, Coimbatore (IN)

(73) Assignee: SCHLUMBERGER TECHNOLOGY CORPORATION, Sugar land, TX (US)

( * ) Notice: Subject to any disclaimer, the term of this patent is extended or adjusted under 35 U.S.C. 154(b) by 2 days.

(21) Appl. No.: 18/654,171

(22) Filed: May 3, 2024

(65) Prior Publication Data

US 2025/0341143 A1 Nov. 6, 2025

(51) Int. Cl.
*E21B 33/06* (2006.01)

(52) U.S. Cl.
CPC .................. *E21B 33/062* (2013.01)

(58) Field of Classification Search
CPC .............................. E21B 33/06; E21B 33/062
USPC .................... 251/1.1, 1.2, 1.3; 166/85.4
See application file for complete search history.

(56) References Cited

U.S. PATENT DOCUMENTS

| | | | |
|---|---|---|---|
| 2,855,172 A | 10/1958 | Jones | |
| 3,272,222 A * | 9/1966 | Allen | E21B 33/062 251/1.3 |
| 3,554,480 A * | 1/1971 | Rowe | E21B 33/062 251/282 |
| 3,647,174 A * | 3/1972 | LeRouax | E21B 33/062 251/1.3 |
| 3,670,761 A * | 6/1972 | Lerouax | E21B 33/062 251/1.3 |
| 3,827,668 A | 8/1974 | De Vries | |
| 4,009,753 A | 3/1977 | McGill | |
| 4,437,643 A * | 3/1984 | Brakhage, Jr. | E21B 33/062 251/1.3 |
| 4,492,359 A * | 1/1985 | Baugh | E21B 33/062 251/1.3 |
| 4,589,625 A * | 5/1986 | Jones | E21B 33/062 251/1.3 |

(Continued)

FOREIGN PATENT DOCUMENTS

| | | |
|---|---|---|
| CN | 201250633 | 6/2009 |
| CN | 108286419 | 7/2018 |

(Continued)

OTHER PUBLICATIONS

Parveen Industries Pvt. Ltd., Coil Tubing Quad BOP product brochure, Dehli, India, 2023, 7 pages.

(Continued)

*Primary Examiner* — Umashankar Venkatesan
(74) *Attorney, Agent, or Firm* — Kyle R. Miiller

(57) ABSTRACT

A blowout preventer (BOP) includes a BOP housing. The BOP also includes a bonnet housing having a bonnet flange and a bonnet body with an actuator configured to drive a ram within the BOP housing. The BOP further includes multiple ram change assemblies configured to drive the bonnet housing toward and away from the BOP housing and to couple the bonnet flange to the bonnet body.

18 Claims, 12 Drawing Sheets

(56) References Cited

U.S. PATENT DOCUMENTS

| | | | |
|---|---|---|---|
| 4,646,825 A | 3/1987 | Van Winkle | |
| 5,590,867 A | 1/1997 | Van Winkle | |
| 6,843,463 B1 | 1/2005 | Mcwhorter | |
| 7,051,990 B2 * | 5/2006 | Springett | E21B 33/062 |
| | | | 251/1.1 |
| 7,086,467 B2 | 8/2006 | Schlegelmilch | |
| 7,225,873 B2 | 6/2007 | Schlegelmilch | |
| 7,270,190 B2 | 9/2007 | McWhorter | |
| 7,410,003 B2 | 8/2008 | Ravensbergen | |
| 8,567,490 B2 | 10/2013 | Van Winkle | |
| 8,770,274 B2 | 7/2014 | Van Winkle | |
| 10,378,301 B2 * | 8/2019 | Alhat | F16K 51/00 |
| 10,689,937 B1 | 6/2020 | Horn | |
| 10,767,437 B2 * | 9/2020 | Shimonek | F16L 23/024 |
| 11,098,550 B2 * | 8/2021 | Givens | E21B 33/062 |
| 11,952,856 B2 * | 4/2024 | Katanguri | E21B 33/061 |
| 2002/0074131 A1 | 6/2002 | Jones | |
| 2004/0124380 A1 | 7/2004 | Van Winkle | |
| 2012/0241007 A1 * | 9/2012 | Lenz | F16K 31/04 |
| | | | 251/213 |
| 2014/0284506 A1 | 9/2014 | Arteaga | |
| 2017/0107779 A1 * | 4/2017 | Akhare | E21B 33/063 |
| 2019/0330955 A1 * | 10/2019 | Hilburn | E21B 33/062 |
| 2021/0156216 A1 | 5/2021 | Strankman | |

FOREIGN PATENT DOCUMENTS

| | | |
|---|---|---|
| CN | 208502721 | 2/2019 |
| CN | 212479156 | 2/2021 |
| EP | 0742344 A2 | 11/1996 |
| GB | 2257733 A | 1/1993 |

OTHER PUBLICATIONS

National Oilwell Varco, Texas Oil Tools Well Intervention Equipment Catalog, Houston, Texas, 2016, 15 pages.

* cited by examiner

BLOWOUT PREVENTER SYSTEMS AND METHODS

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below a surface of the earth, drilling systems are often employed to carry out drilling operations to access the desired resource. The drilling systems generally include a wellhead assembly mounted above a wellbore of a well. Additionally, at various times, a pressure control equipment (PCE) stack may be mounted to the wellhead assembly to carry out intervention operations to inspect or to service the well. During the drilling operations and the intervention operations, a pressure control valve (e.g., a blowout preventer [BOP]) is mounted above the wellhead assembly to protect other well equipment from surges in pressure within the wellbore.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a blowout preventer (BOP) includes a BOP housing. The BOP also includes a bonnet housing having a bonnet flange and a bonnet body with an actuator configured to drive a ram within the BOP housing. The BOP further includes multiple ram change assemblies configured to drive the bonnet housing toward and away from the BOP housing and to couple the bonnet flange to the bonnet body.

In certain embodiments, a blowout preventer (BOP) includes a bonnet flange and a bonnet body that houses an actuator. The BOP also includes multiple ram change assemblies, wherein each ram change assembly of the multiple ram change assemblies includes a ram change cylinder that engages the bonnet flange and a ram change end cap that engages the bonnet body to block movement of the bonnet flange relative to the bonnet body along an axial axis.

In certain embodiments, a method of operating a blowout preventer (BOP) includes coupling a bonnet flange and a bonnet body together via multiple ram change assemblies. The method also includes providing fluid to a disengagement ram change assembly of the multiple ram change assemblies to drive the bonnet flange and the bonnet body away from a BOP housing of the BOP.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
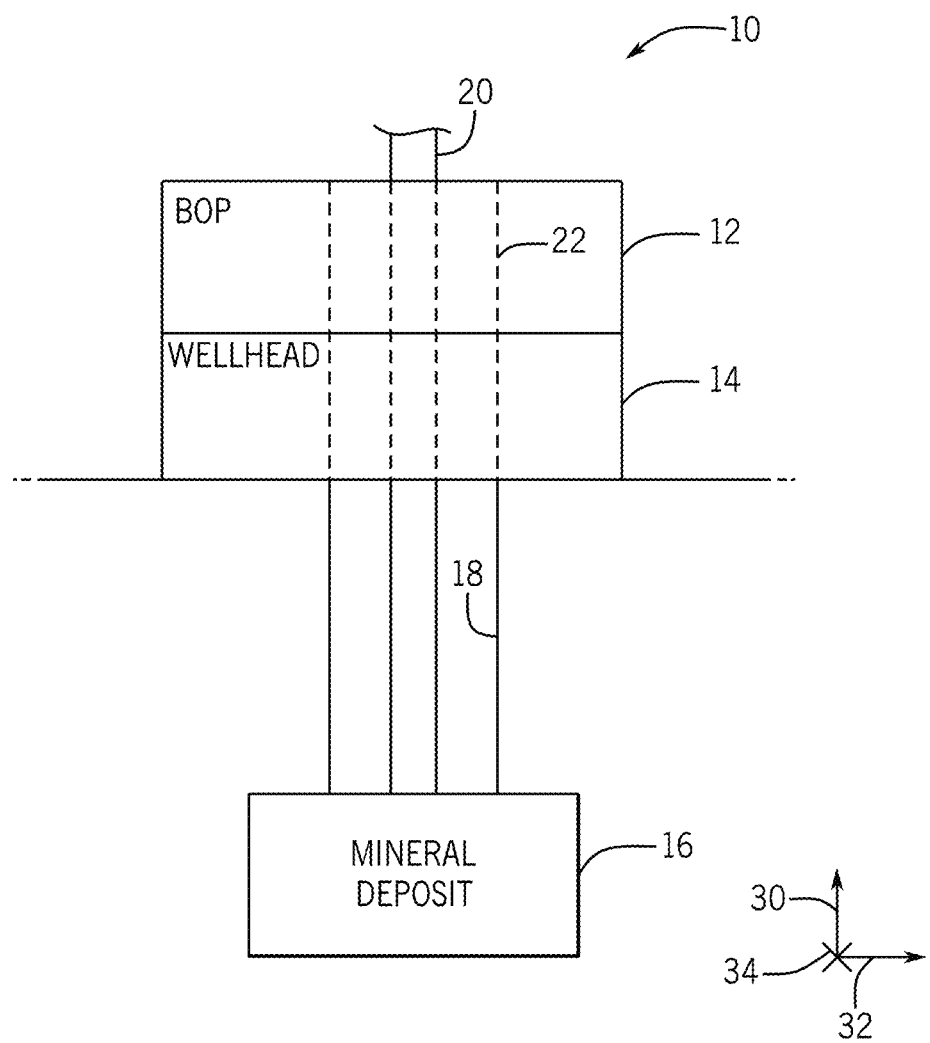
FIG. 1 is a block diagram of a system that includes a wellhead assembly and a blowout preventer (BOP) stack, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to a blowout preventer (BOP), as well as a method of operating the BOP. The BOP may include a ram change system with multiple ram change assemblies that each include a ram change cylinder, a ram change piston, and an end cap. The ram change system may also include a hydraulic system that includes one or more ports and one or more fluid passageways to enable a flow of fluid to perform various functions at the BOP, such as to drive one or more rams of the BOP within a BOP housing to transition the BOP between an open configuration and a closed configuration, as well as to drive one or more bonnets relative to the BOP housing to facilitate access to the one or more rams of the BOP (e.g., for maintenance operations for the one or more rams of the BOP). As described herein, the BOP may include additional features, such as one or more secondary pistons to facilitate shearing operations and/or one or more pressure equalizing valves to facilitate pressure equalization at the BOP.

The BOP may be employed during intervention operations. In particular, the BOP may be part of a pressure control equipment (PCE) stack that is coupled to and/or positioned vertically above a wellhead assembly during intervention operations. A conduit may extend through a central bore of the BOP to position and/or operate a tool in a wellbore of a well or to carry out other desirable tasks during the intervention operations.

It should be appreciated that the BOP may be utilized in other contexts and during other operations. For example, the BOP may be employed during drilling operations. In particular, the BOP may be coupled to and/or positioned vertically above a wellhead assembly during drilling operations. A drill string may be suspended from a rig through the BOP into a wellbore of a well, and a drilling fluid is delivered through the drill string and returned up through an annulus between the drill string and a casing that lines the wellbore to facilitate the drilling operations.

In any case, in the event of a rapid invasion of formation fluid in the wellbore, commonly known as a "kick," the BOP may be actuated to drive one or more rams of the BOP to transition the BOP to the closed configuration to seal the wellbore and to control fluid pressure in the wellbore, thereby protecting well equipment positioned above the BOP. In the present disclosure, a conduit may be any of a variety of tubular or cylindrical structures, such as a drill string, a wireline, a Streamline™, a slickline, a coiled tubing, or other spoolable rod.

With the foregoing in mind, FIG. 1 is a block diagram of an embodiment of a system 10. The system 10 may be configured to perform work on a well to facilitate access to various natural resources (e.g., hydrocarbons, such as oil and/or natural gas). The system 10 may be a land-based system (e.g., a surface system) or an offshore system (e.g., an offshore platform system).

As shown, a blowout preventer (BOP) stack 12 (e.g., valve stack) may be mounted to a wellhead assembly 14, which is coupled to a mineral deposit 16 via a wellbore 18. It should be appreciated that any of a variety of additional components may be mounted to or coupled to the wellhead assembly 14. For example, during intervention operations, the wellhead assembly 14 may be coupled to a pressure control equipment (PCE) stack that includes the BOP stack 12. It should be appreciated that the BOP stack 12 may include a single BOP or may include multiple BOPs coupled to one another.

In any case, downhole operations are carried out by a conduit 20 that extends through a central bore 22 of the BOP stack 12, through the wellhead assembly 14, and into the wellbore 18. As discussed in more detail herein, the BOP stack 12 may include a ram change system that is configured to facilitate access to one or more rams of the one or more BOPs in the BOP stack 12. To facilitate discussion, the BOP stack 12 and its components may be described with reference to a vertical axis or direction 30, an axial axis or direction 32, and/or a lateral axis or direction 34.

Figure 2:
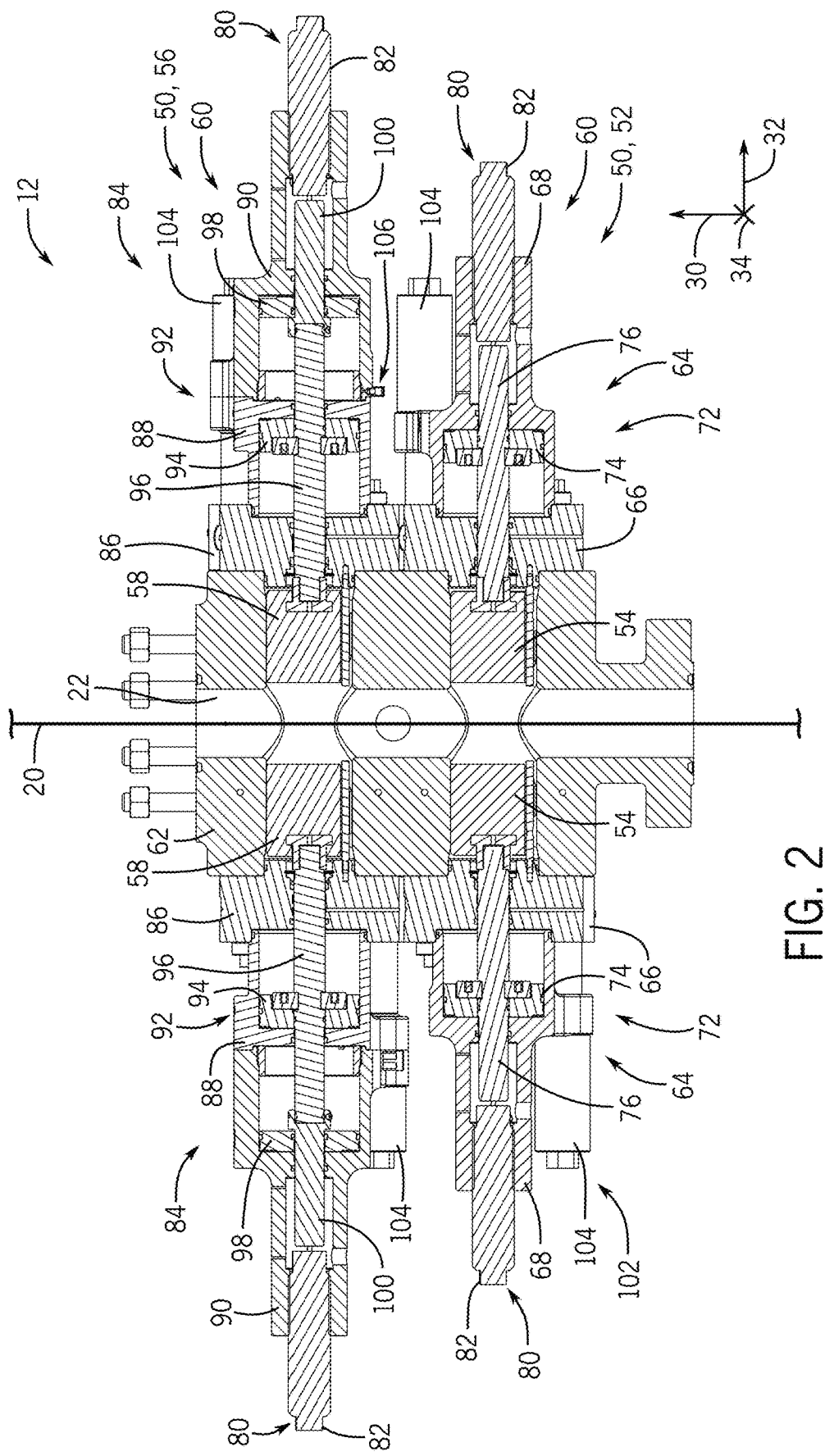
FIG. 2 is a cross-sectional side view of the BOP stack of FIG. 1, in accordance with an embodiment of the present disclosure.

FIG. 2 is a cross-sectional side view of an embodiment of the BOP stack 12 that may be used in the system 10 of FIG. 1. In the illustrated embodiment, the BOP stack 12 includes two BOPs 50 that are vertically stacked relative to one another. However, the BOP stack 12 may include any suitable number of BOPs 50 (e.g., 1, 2, 3, 4, or more). Further, the BOP stack 12 may include any suitable type of BOPs 50 with one or more functions, such as shear, slip, blind seal, and/or pipe seal. For example, the BOP stack 12 may include one BOP 50 (e.g., a combination BOP, also referred to as a "combi BOP") with multiple functions, such as shear and blind seal, or such as slip and pipe seal.

In FIG. 2, the BOPs 50 include a first BOP 52 with opposed rams 54 and a second BOP 56 with opposed rams 58. With reference to the first BOP 52, the opposed rams 54 are positioned such that the first BOP 52 is in an open configuration 60. In the open configuration 60, the opposed rams 54 are withdrawn from the central bore 22, do not contact the conduit 20, and/or do not contact one another. In operation, the opposed rams 54 move toward and away from one another along the axial axis 32 to adjust the first BOP 52 between the open configuration 60 in which the opposed rams 54 do not seal the central bore 22 and a closed configuration in which the opposed rams 54 seal the central bore 22 (e.g., seal about the conduit 20 to seal the central bore 22; shear the conduit 20 and then seal the central bore 22). As shown, the BOP stack 12 includes a BOP housing 62 surrounding the central bore 22. The BOP housing 62 may have any cross-sectional shape, including any polygonal shape and/or annular shape. The BOP housing 62 defines a cavity that supports the opposed rams 54.

The first BOP 52 includes first bonnet assemblies 64 mounted on opposite sides of the BOP housing 62. Each of the first bonnet assemblies 64 includes a first bonnet flange 66 and a first bonnet body 68, which together may be considered to form a bonnet housing. The first bonnet body 68 may be considered an operating cylinder that supports a first actuator 72, which may include a piston 74 and a connecting rod 76. The first actuator 72 may drive the opposed rams 54 toward and away from one another along the axial axis 32 to transition the first BOP 52 between the open configuration 60 and the closed configuration.

Additionally, each of the first bonnet assemblies 64 supports or is coupled to a lock assembly 80. As shown, the lock assembly 80 includes opposed lock screws 82 that are adjusted (e.g., manually adjusted) to contact and apply force to the connecting rods 76 to the lock the first BOP 52 in the closed configuration. However, it should be appreciated that the lock assembly 80 may have any suitable components in any suitable arrangement to lock the first BOP 52 in the closed configuration.

With reference to the second BOP 56, the opposed rams 58 are positioned such that the second BOP 56 is also in the open configuration 60. In operation, the opposed rams 58 move toward and away from one another along the axial axis 32 to adjust the second BOP 56 between the open configuration 60 and the closed configuration. The second BOP 56 includes second bonnet assemblies 84 mounted on opposite sides of the BOP housing 62. Each of the second bonnet assemblies 84 includes a second bonnet flange 86, a second bonnet body 88, and an additional bonnet body 90, which together may be considered to form a bonnet housing. The second bonnet body 88 may be considered an operating cylinder that supports a second actuator 92, which may include a piston 94 and a connecting rod 96. Additionally, the additional bonnet body 90 may be considered an additional operating cylinder that supports an additional piston 98 and an additional connecting rod 100 to supplement or to increase closing force applied by the second actuator 92. As described in more detail herein, the second actuator 92 may drive the opposed rams 58 toward and away from one another along the axial axis 32 to transition the second BOP 56 between the open configuration 60 and the closed configuration. Also, as described in more detail herein, the second BOP 56 may include pressure valves 106 (e.g., ports), which may allow fluid (e.g., air) to pass across the pressure valves 106 to facilitate transition of the second BOP 56 to the open configuration 60.

Additionally, each of the second bonnet assemblies 84 supports or is coupled to a respective lock assembly 80, which may include the opposed lock screws 82 that are manually adjusted to contact and apply force to the additional connecting rods 100 to lock the second BOP 56 in the closed configuration. However, it should be appreciated that the lock assembly 80 may have any suitable components in any suitable arrangement to lock the second BOP 56 in the closed configuration.

As discussed in more detail herein, the BOP stack 12 may include a ram change system 102 with multiple ram change assemblies 104. For example, with respect to the first BOP 52, the ram change system 102 may facilitate transition of the first BOP 52 between the open configuration 60 and the closed configuration, as well as drive the first bonnet assemblies 64 relative to the BOP housing 62 to facilitate access to the opposed rams 54 of the first BOP 52 (e.g., for maintenance operations). Further, with respect to the second BOP 56, the ram change system 102 may facilitate transition of the second BOP 56 between the open configuration 60 and the closed configuration, as well as drive the second bonnet assemblies 84 relative to the BOP housing 62 to facilitate access to the opposed rams 58 of the second BOP 56 (e.g., for maintenance operations).

Figure 3:
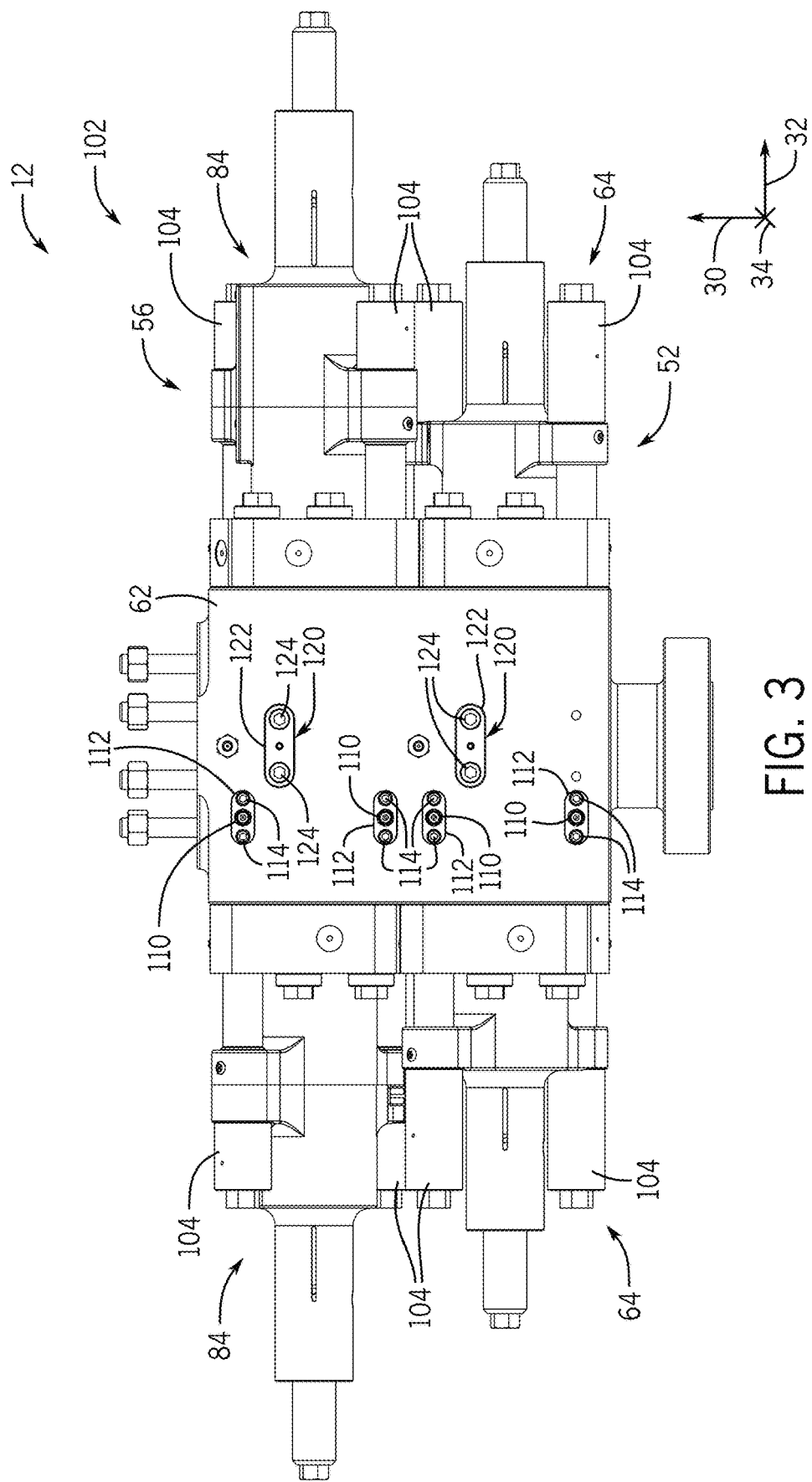
FIG. 3 is a side view of the BOP stack of FIG. 1, in accordance with an embodiment of the present disclosure.

FIG. 3 is a side view of an embodiment of the BOP stack 12. As shown, the BOP stack 12 includes the first BOP 52 and the second BOP 56. The first BOP 52 includes the first bonnet assemblies 64 mounted on opposite sides of the BOP housing 62. The second BOP 56 includes the second bonnet assemblies 84 mounted on opposite sides of the BOP housing 62.

The ram change system 102 includes the multiple ram change assemblies 104, such as two ram change assemblies 104 on each side of the first BOP 52 and two ram change assemblies 104 on each side of the second BOP 56. The ram change system 102 also includes multiple ports 110 provided in the BOP housing 62. The multiple ports 110 may fluidly couple to internal fluid passageways (e.g., formed in and through the BOP housing 62), which in turn may fluidly couple to the first actuator 72, the second actuator 92, and/or the multiple ram change assemblies 104. In certain embodiments, the multiple ports 110 may be provided by multiple fluid subs 112 (e.g., port saver subs), which may fit into respective openings formed in the BOP housing 62 and/or may be mounted to the BOP housing 62 via one or more fasteners 114. Multiple hoses may connect to the multiple ports 110 via quick connect assemblies or any other suitable connection. Advantageously, the multiple fluid subs 112 may facilitate maintenance operations. For example, if one of the multiple ports 110 is damaged, this may be addressed by replacing one of the multiple fluid subs 112 instead of an entirety of the BOP housing 62.

In FIG. 3, the BOP stack 12 also includes multiple pressure equalizing valve assemblies 120. For example, the BOP stack 12 may include one pressure equalizing valve assembly 120 for the first BOP 52 and one pressure equalizing valve assembly 120 for the second BOP 56 to facilitate pressure equalization under certain conditions and/or at certain times (e.g., prior to transition of a respective BOP from the closed configuration to the open configuration). In certain embodiments, the one or more pressure equalizing valve assemblies 120 may be provided by multiple pressure equalizing subs 122 (e.g., port saver subs), which may fit into respective openings formed in the BOP housing 62 and/or may be mounted to the BOP housing 62 via one or more fasteners 124. Advantageously, the multiple pressure equalizing subs 122 may facilitate maintenance operations. For example, if one of the one or more pressure equalizing valve assemblies 120 is damaged, this may be addressed by replacing one of the multiple pressure equalizing subs 122 instead of an entirety of the BOP housing 62.

Figure 4:
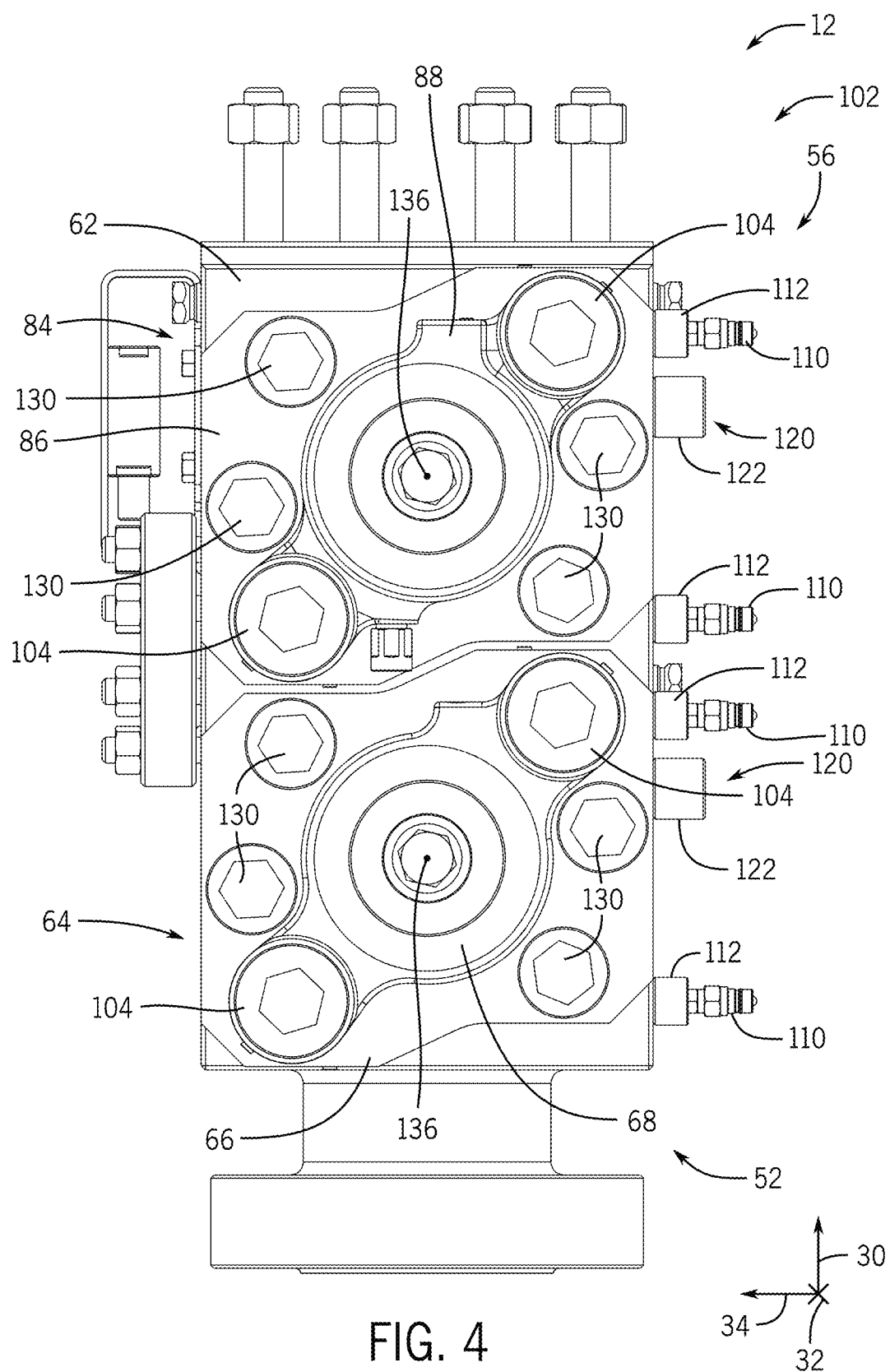
FIG. 4 is an end view of the BOP stack of FIG. 1, in accordance with an embodiment of the present disclosure.

FIG. 4 is an end view of an embodiment of the BOP stack 12. As shown, the BOP stack 12 includes the first BOP 52 and the second BOP 56. Further, as shown, one of the first bonnet assemblies 64 and one of the second bonnet assemblies 84 are mounted on a first side of the BOP housing 62 (e.g., a first side along the axial axis 32).

The ram change system 102 includes the multiple ram change assemblies 104, such as two ram change assemblies 104 for the first BOP 52 and two ram change assemblies 104 for the second BOP 56 on the first side of the BOP housing 62. The ram change system 102 also includes the multiple ports 110 provided by the multiple fluid subs 112. Additionally, the BOP stack 12 includes the multiple pressure equalizing valve assemblies 120 provided by the multiple pressure equalizing subs 122. As such, in FIG. 4, the BOP stack 12 includes multiple subs, such as the multiple fluid subs 112 and the multiple pressure equalizing subs 122. It should be appreciated that the BOP stack 12 may include any suitable number and type(s) of subs, including any suitable number of fluid subs 112 and/or any suitable number of pressure equalizing subs 122.

With reference to the first BOP 52 in FIG. 4, the one of the first bonnet assemblies 64 includes the first bonnet flange 66 and the first bonnet body 68. With reference to the second BOP 56 in FIG. 4, the one of the second bonnet assemblies 84 includes the second bonnet flange 86 and the second bonnet body 88. In certain embodiments, the BOP housing 62 and the first bonnet flange 66 may be configured to receive one or more fasteners 130 (e.g., threaded fasteners, such as bolts). Similarly, the BOP housing 62 and the second bonnet flange 86 may be configured to receive one or more fasteners 130 (e.g., threaded fasteners, such as bolts).

Advantageously, the first bonnet assemblies 64 may be designed to be interchangeable with one another, and the second bonnet assemblies 84 may be designed to be interchangeable with one another. For example, the one of the first bonnet assemblies 64 shown on the first side of the BOP housing 62 may be rotated and installed on a second side of the BOP housing 62 that is opposite from the first side of the BOP housing 62 along the axial axis 32. Similarly, the one of the second bonnet assemblies 84 shown on the first side of the BOP housing 62 may be rotated and installed on a second side of the BOP housing 62 that is opposite from the first side of the BOP housing 62 along the axial axis 32. Further, in certain embodiments, the first bonnet assemblies 64 and the second bonnet assemblies 84 may be designed to be interchangeable with one another. Certain features, such as locations of the internal fluid passageways and placement of the multiple ram change assemblies 104, facilitate such interchangeability. For example, for a particular bonnet assembly (e.g., the one of the first bonnet assemblies 64, the one of the second bonnet assemblies 84), the multiple ram change assemblies 104 are positioned diagonally from one another (e.g., spaced apart along the vertical axis 30 and the lateral axis 34; on opposite sides of a central axis 136 relative to the vertical axis 30 and the lateral axis 34), to facilitate such interchangeability.

Figure 5:
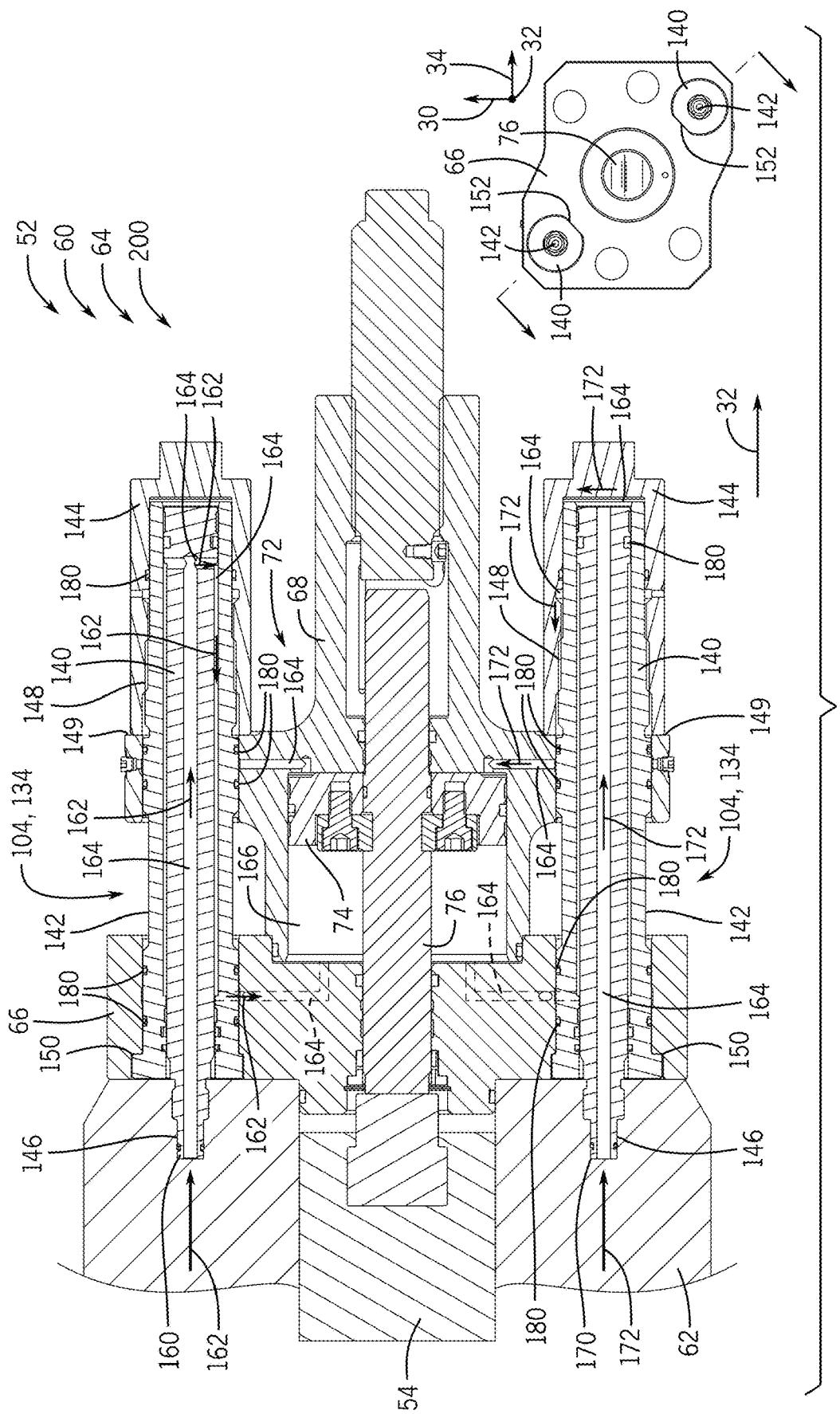
FIG. 5 is a cross-sectional view of a portion of a first BOP that may be utilized as part of the BOP stack of FIG. 1, wherein the first BOP is in an open configuration and engaged configuration, in accordance with an embodiment of the present disclosure.

FIG. 5 is a cross-sectional view of an embodiment of a portion of the first BOP 52, wherein the cross-sectional view is taken in a plane through two ram change assemblies 104. To facilitate discussion, the two ram change assemblies 104 are also referred to herein as an engagement ram change assembly 132 and a disengagement ram change assembly 134. As shown, the portion of the first BOP 52 includes one of the opposed rams 54 in the BOP housing 62, and one of the first bonnet assemblies 64 coupled to the BOP housing 62. The first bonnet assembly 64 includes the first bonnet flange 66 and the first bonnet body 68, which supports the first actuator 72 with the piston 74 and the connecting rod 76.

As shown, the first bonnet body 68 may be formed as one piece. Further, the first bonnet flange 66 and the first bonnet body 68 may be held together (e.g., in contact with one another) via the ram change assemblies 104. For example, the ram change cylinders 142 and the ram change end caps 144 hold the first bonnet flange 66 and the first bonnet body 68 together (e.g., block separation along the axial axis 32). In particular, each ram change end cap 144 may be mounted (e.g., fixed) to a respective ram change cylinder 142, such as via a respective threaded interface 148. For example, each ram change end cap 144 may include a threaded portion that fits about a respective ram change cylinder 142 with corresponding threads to threadably couple the threaded portion of each ram change end cap 144 to the respective ram change cylinder 142.

As shown, the ram change end caps 144 may contact and engage the first bonnet body 68 when threadably coupled to the ram change cylinders 142. In particular, each ram change end cap 144 engages with the first bonnet body 68, such as via a respective surface 149 (e.g., end surface). Further, each ram change cylinder 142 engages with the first bonnet flange 66, such as via a respective shoulder 150. For example, each ram change cylinder 142 may include the respective shoulder 150 as a radially expanded end portion that contacts and engages with a corresponding shoulder of the first bonnet flange 66. Thus, at each ram change assembly 104 with the ram change end cap 144 and the ram change cylinder 142 coupled together via the respective threaded interface 148, the respective surface 149 of the ram change end cap 144 and the respective shoulder 150 of the ram change cylinder 142 provide opposed surfaces (e.g., axially-facing surfaces) that contact and hold the first bonnet flange 66 and the first bonnet body 68 together along the axial axis 32. Together, the threaded interfaces 148 and the shoulder 150 retain the first bonnet flange 66, the first bonnet body 68, the ram change cylinders 142, and the ram change end caps 144 together (e.g., block separation or relative movement along the axial axis 32).

Further, as shown, the engagement ram change assembly 132 and the disengagement ram change assembly 134 (e.g., the respective ram change cylinders 142) also pass through or extend through openings of the first bonnet flange 66 and the first bonnet body 68, which facilitates retention and enables the ram change cylinders 142 and the ram change end caps 144 to provide support via the opposed surfaces. Advantageously, this structure may be utilized instead of bonnet fasteners (e.g., bolts) to hold the first bonnet flange 66 and the first bonnet body 68 together. Thus, this structure may be devoid of bonnet fasteners that hold the first bonnet flange 66 to the first bonnet body 68 together (e.g., the multiple ram change assemblies 104 operate as the bonnet fasteners and no other structures or coupling devices extend between and secure the first bonnet flange 66 to the first bonnet body 68 together). However, it should be appreciated that bonnet fasteners may be implemented in conjunction with the multiple ram change assemblies 104 in certain cases and/or bonnet fasteners may be implemented in conjunction with any other features disclosed herein (e.g., the second bonnet assemblies 84 and their features).

In certain embodiments, each ram change cylinder 142 may include an anti-rotation feature 152, such as a flat surface, a protrusion, a non-circular cross-sectional shape, or other suitable structural feature to block rotation of the ram change cylinder 142 relative to the bonnet flange 66, as shown in an inset provided in FIG. 5. In particular, the inset provided in FIG. 5 is an end view of the bonnet flange 66 with the ram change pistons 140 within the ram change cylinders 142, and the ram change cylinders 142 within openings of the bonnet flange 66. As shown, the anti-rotation feature 152 includes the flat surface that forms the non-circular cross-sectional shape for the ram change cylinders 142 (e.g., end or shoulder portions of the ram change cylinders 142), and thus blocks the rotation of the ram change cylinders 142 relative to the bonnet flange 66. It should be appreciated that the inset provided in FIG. 5 is illustrated at a smaller scale than a remainder of FIG. 5 to provide image clarity for the remainder of FIG. 5.

The engagement ram change assembly 132 and the disengagement ram change assembly 134 each include a ram change piston 140, a ram change cylinder 142, and a ram change end cap 144. Each ram change piston 140 is mounted (e.g., fixed) to the BOP housing 62, such as via a respective threaded interface 146. For example, each ram change piston 140 may include a first end portion with threads, and the BOP housing 62 may include openings with corresponding threads to threadably couple the threaded end portion of each ram change piston 140 to the BOP housing 62.

Further, each ram change piston 140 is slidingly positioned within a respective ram change cylinder 142 (e.g., configured to slide along the axial axis 32 relative to the respective ram change cylinder 142). Thus, as described herein, each ram change piston 140 mounted to the BOP housing 62 may provide or operate as a guide rod to facilitate separation of certain portions of the first bonnet assembly 64 (e.g., the first bonnet flange 66, the first bonnet body 68, the ram change cylinders 142, and the ram change end caps 144) from the BOP housing 62.

In operation, with the one or more fasteners 130 of FIG. 3 fastened (e.g., tightened) to secure the first bonnet assembly 64 to the BOP housing 62, a fluid may be provided via one of the multiple ports 110 of FIGS. 2-4 and may flow through a respective internal passageway to the engagement ram change assembly 132. In particular, the fluid may flow through the respective internal passageways to an inlet 160 at or proximate to the first end portion, as shown by arrows 162. The first bonnet assembly 64 also includes bonnet fluid passageways 164 that fluidly couple the inlet 160 to a portion of a chamber 166, and thus, the fluid may drive the piston 74 within the chamber 166 to drive the opposed ram 54 to transition the first BOP 52 to the open configuration 60. For example, the bonnet fluid passageways 164 may be provided and/or extend through a center portion (e.g., axial channel; along a center axis) of the ram change piston 140 of the engagement ram change assembly 132, radially from the center portion to an annular space defined between an outer wall of the ram change piston 140 and the ram change cylinder 142 of the engagement ram change assembly 132, and through the ram change cylinder 142 into the first bonnet flange 66 to reach the portion of the chamber 166, and thus the fluid may flow as shown by the arrows 162.

Further, with the one or more fasteners 130 of FIG. 3 fastened (e.g., tightened) to secure the first bonnet assembly 64 to the BOP housing 62, a fluid may be provided via one of the multiple ports 110 of FIGS. 2-4 and may flow through a respective internal passageway to the disengagement ram change assembly 134. In particular, the fluid may flow through the respective internal passageway to an inlet 170 at or proximate to the first end portion, as shown by arrows 172. The first bonnet assembly 64 also includes the bonnet fluid passageways 164 that fluidly couple the inlet 170 to another portion of the chamber 166, and thus, the fluid may drive the piston 74 within the chamber 166 to drive the one of the opposed rams 54 to transition the first BOP 52 to the closed configuration. For example, the bonnet fluid passageways 164 may be provided and/or extend through a center portion (e.g., axial channel; along a center axis) of the ram change piston 140 of the disengagement ram change assembly 134, to a space defined between opposed surfaces of a second end portion of the ram change piston 140 and the ram change end cap 144 of the disengagement ram change assembly 134, and through an annular space defined between an outer wall of the ram change cylinder 142 and the ram change end cap 144 (and/or through a channel formed in the ram change end cap 144 and/or the ram change cylinder 142) into the first bonnet flange 66 to reach the another portion of the chamber 166, and thus the fluid may flow as shown by the arrows 172.

Figure 6:
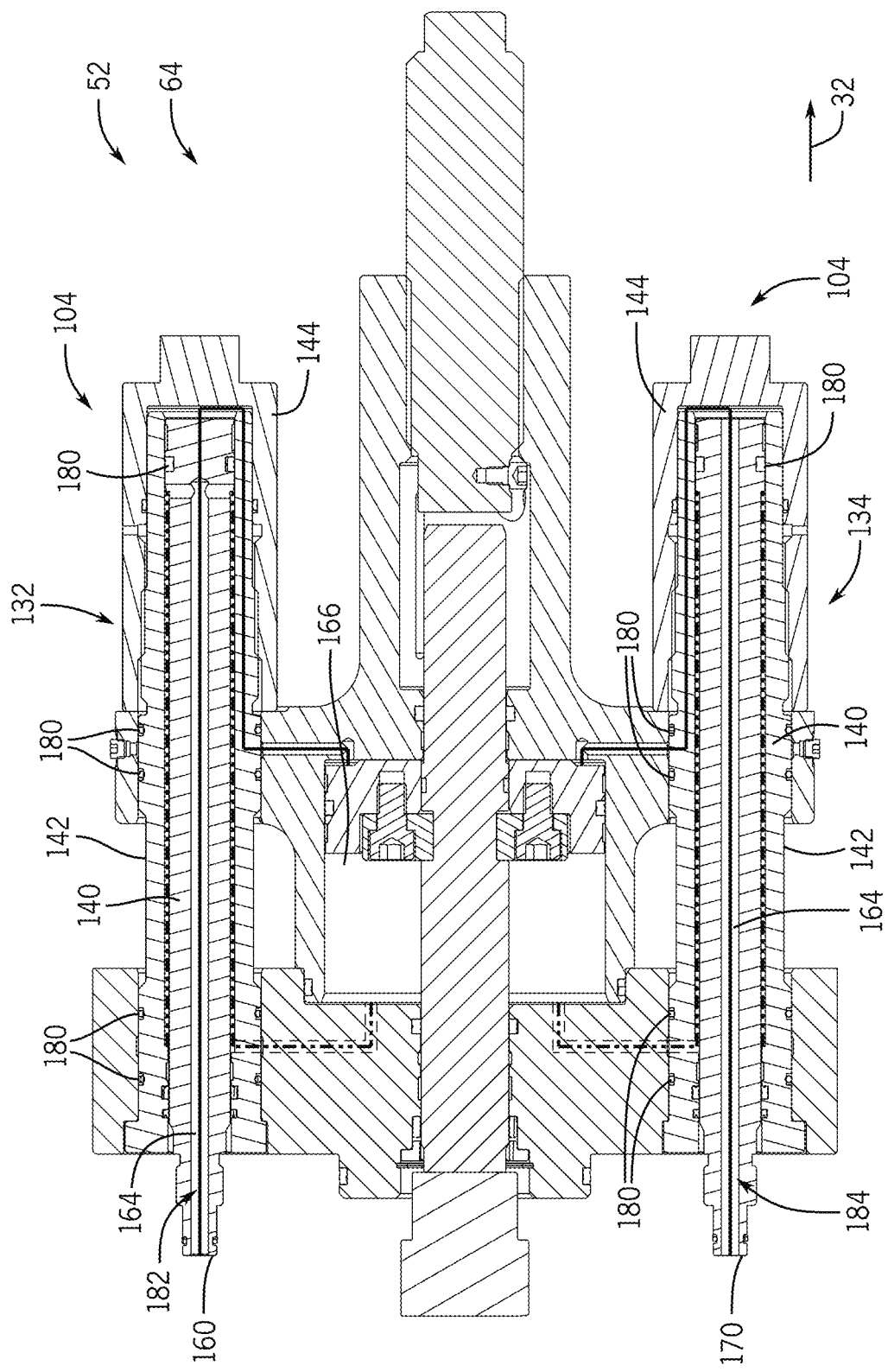
FIG. 6 is a cross-sectional view of a portion of the first BOP of FIG. 5 with multiple fluid paths, in accordance with an embodiment of the present disclosure.

FIG. 6 is a cross-sectional view of an embodiment of a portion of the first BOP 52 to illustrate fluid paths formed by the bonnet fluid passageways 164 within the first bonnet assembly 64, wherein the cross-sectional view is taken in a plane through the two ram change assemblies 104. With reference to FIG. 5 and as best shown in FIG. 6, due to various seals 180 (e.g., annular seals; o-rings) and placement of the bonnet fluid passageways 164, the fluid is directed through two fluid paths about the first bonnet assembly 64. In particular, the fluid that is provided to the inlet 160 at the engagement ram change assembly 132 is permitted to flow into and to fill particular spaces that may form or be considered an open/engagement fluid path 182 (e.g., first fluid path), and the fluid that is provided to the inlet 170 at the disengagement ram change assembly 134 is permitted to flow into and to fill other particular spaces that may form or be considered a close/disengagement fluid path 184 (e.g., second fluid path).

For example, the fluid that is provided to the inlet 160 at the engagement ram change assembly 132 is permitted to flow into and to fill particular spaces to form the open/engagement fluid path 182 including the center portion of the ram change piston 140 of the engagement ram change assembly 132, the annular space defined between the outer wall of the ram change piston 140 and the ram change cylinder 142 of the engagement ram change assembly 132, and the portion of the chamber 166. Further, the fluid that is provided to the inlet 160 of the engagement ram change assembly 132 is permitted to flow into and to fill particular spaces about the ram change piston 140 of the disengagement ram change assembly 134, such as an annular space defined between an outer wall of the ram change piston 140 and the ram change cylinder 142 of the disengagement ram change assembly 134, which may also be part of the open/engagement fluid path 182.

Similarly, the fluid that is provided to the inlet 170 at the disengagement ram change assembly 134 is permitted to flow into and to fill particular spaces to form the close/disengagement fluid path 184 including the center portion of the ram change piston 140 of the disengagement ram change assembly 134, the space defined between the opposed surfaces of the second end portion of the ram change piston 140 and the ram change end cap 144 of the disengagement ram change assembly 134, through the annular space defined between the outer wall of the ram change cylinder 142 and the ram change end cap 144 (and/or through the channel formed in the ram change end cap 144 and/or the ram change cylinder 142), and the another portion of the chamber 166. Further, the fluid that is provided to the inlet 170 of the disengagement ram change assembly 134 is permitted to flow into and to fill particular spaces about the ram change piston 140 of the engagement ram change assembly 132, such as through the annular space defined between the outer wall of the ram change cylinder 142 and the ram change end cap 144 (and/or through a channel formed in the ram change end cap 144 and/or the ram change cylinder 142) of the engagement ram change assembly 132 to reach a space defined between opposed surfaces of a second end portion of the ram change piston 140 and the ram change end cap 144 of the engagement ram change assembly 132, which may also be part of the close/disengagement fluid path 184.

Figure 7:
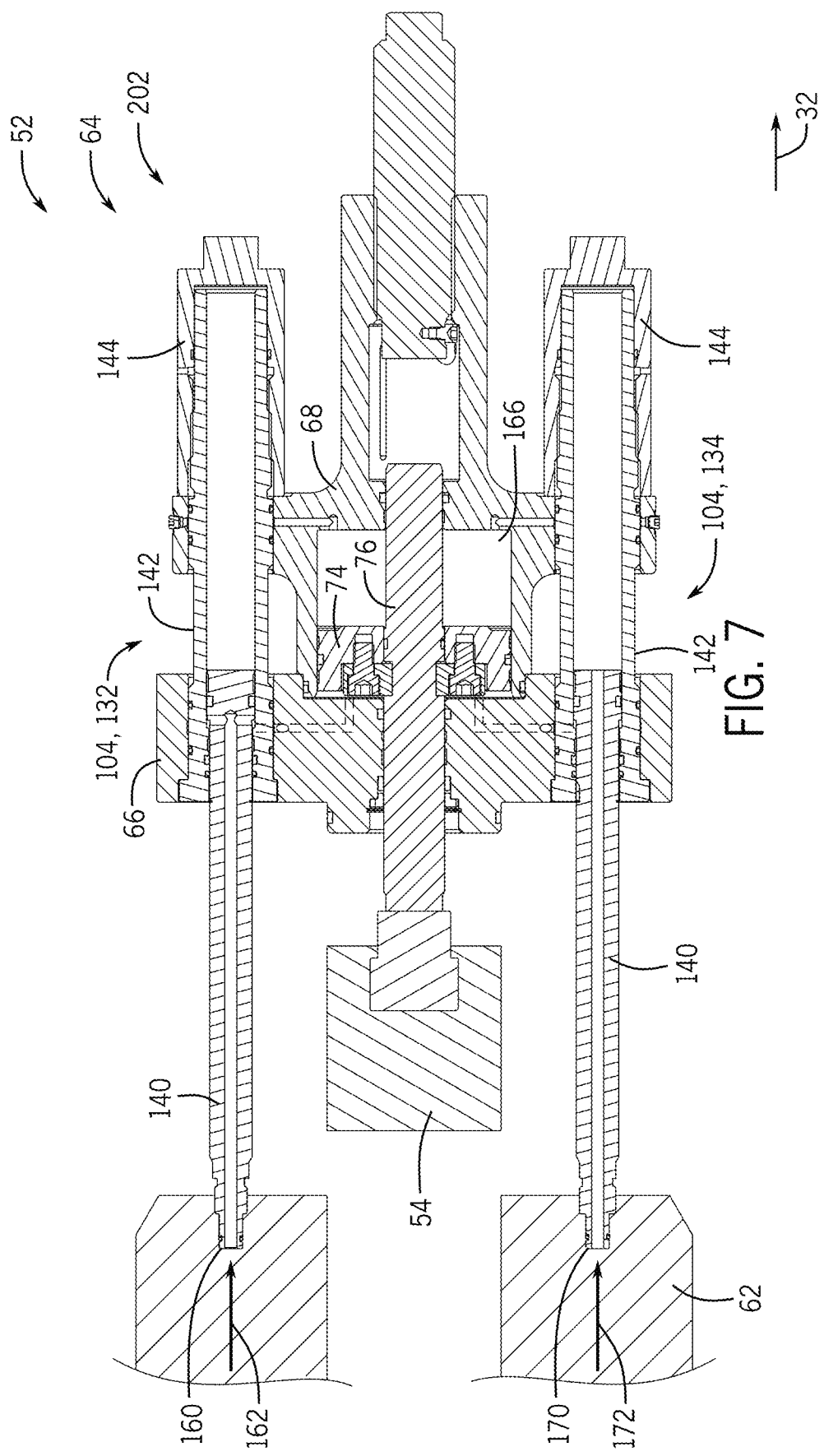
FIG. 7 is a cross-sectional view of a portion of the first BOP of FIG. 5, wherein the first BOP is in a disengaged configuration, in accordance with an embodiment of the present disclosure.

FIG. 7 is a cross-sectional view of an embodiment of a portion of the first BOP 52, wherein the cross-sectional view is taken in a plane through the two ram change assemblies 104. In FIG. 5, the first bonnet assembly 64 is in an engaged configuration 200 in which the first bonnet flange 66 contacts the BOP housing 62, thus the one of the opposed rams 54 is not accessible (e.g., to an operator for maintenance operations). In FIG. 7, the first bonnet assembly 64 is in a disengaged configuration 202 in which the first bonnet flange 66 does not contact the BOP housing 62, thus the one of the opposed rams 54 is accessible (e.g., to the operator for maintenance operations).

Without the one or more fasteners 130 of FIG. 3 fastened (e.g., tightened) to secure the first bonnet assembly 64 to the BOP housing 62, certain components (e.g., the first bonnet flange 66, the first bonnet body 68, the ram change cylinders 142, and the ram change end caps 144; also referred to herein as "movable bonnet components") may move (e.g., slide together; slide as one unit) relative to the BOP housing 62 along the ram change pistons 140. Thus, with the one or more fasteners 130 of FIG. 3 removed or disengaged from the BOP housing 62, the fluid may be provided via one of the multiple ports 110 of FIGS. 2-4 to facilitate ram change operations (e.g., access to the opposed rams 54 by the operator for maintenance operations).

In particular, with reference to FIG. 7, the fluid may flow through one of the internal passageways to the inlet 170, as shown by the arrows 172. The fluid may accumulate in the space between the opposed surfaces of the ram change piston 140 and the ram change end cap 144 of the disengagement ram change assembly 134, which may drive the movable bonnet components away from the BOP housing 62 along the axial axis 32. A distance traveled by the movable bonnet components is sufficient to provide the access to the one of the opposed rams 54 by the operator for maintenance operations.

Similarly, with the one or more fasteners 130 of FIG. 3 removed or disengaged from the BOP housing 62, the fluid may be provided via one of the multiple ports 110 of FIGS. 2-4 to the inlet 160, as shown by the arrows 162. As shown, the fluid may accumulate in the annular space defined between the outer wall of the ram change piston 140 and the ram change cylinder 142 of the engagement ram change assembly 132, as well as the portion of the chamber 166 with the piston 74 and the connecting rod 76, which may drive the movable bonnet components toward the BOP housing 62 along the axial axis 32 until the first bonnet flange 66 contacts and engages the BOP housing 62. In this way, the ram change system 102 provides an efficient way to both drive the opposed rams 54 to transition the first BOP 52 between the open configuration 60 and the closed configuration, as well as to drive the movable bonnet components relative to the BOP housing 62 to facilitate the ram change operations.

While FIGS. 5-7 illustrate the first bonnet assembly 64 on one side of the first BOP 52, it should be appreciated that both of the first bonnet assemblies 64 may operate as described herein. Further, as described herein, both of the first bonnet assemblies 64 may operate together (e.g., simultaneously), such as to adjust both sides of the first BOP 52 together (e.g., simultaneously) to provide the open, closed, engaged, and disengaged configurations in an efficient manner.

Figure 8:
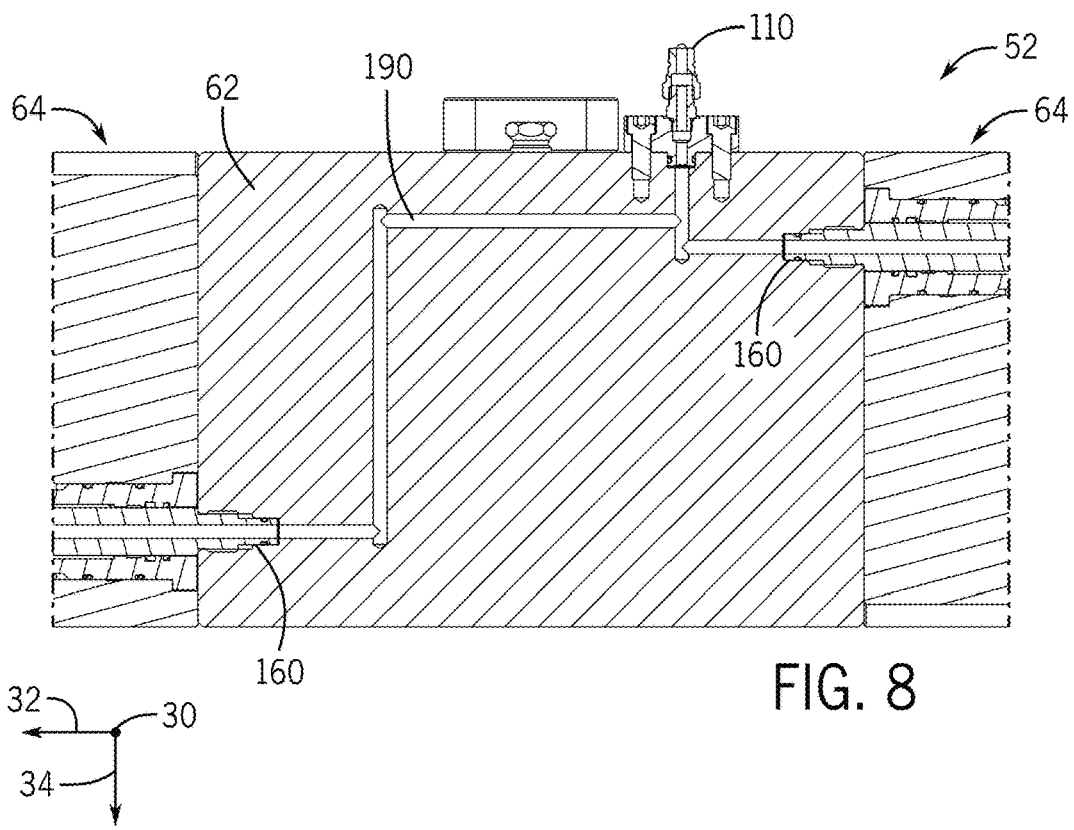
FIG. 8 is a cross-sectional top view of a portion of the first BOP of FIG. 5 with first internal passageways, in accordance with an embodiment of the present disclosure.
Figure 9:
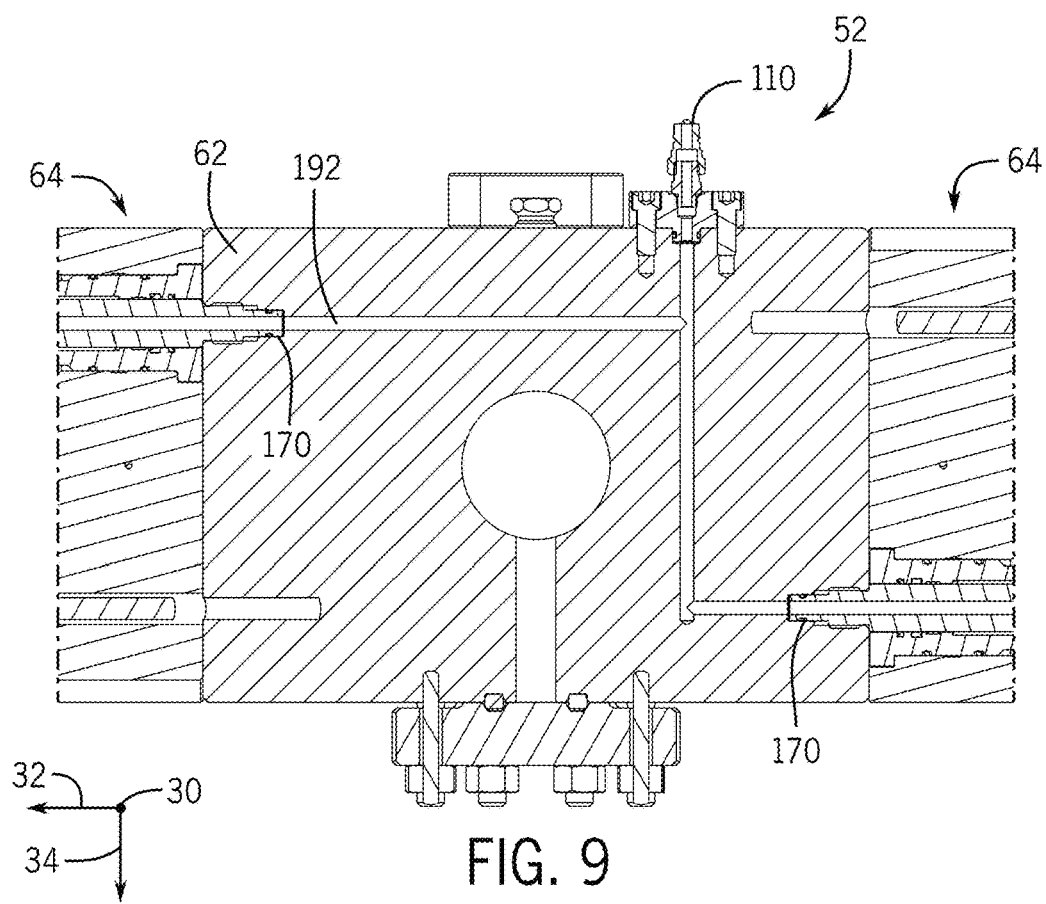
FIG. 9 is a cross-sectional top view of a portion of the first BOP of FIG. 5 with second internal passageways, in accordance with an embodiment of the present disclosure.

FIGS. 8 and 9 are cross-sectional top views of an embodiment of a portion of the first BOP 52. In particular, FIG. 8 is taken in a plane through certain internal passageways 190 through the BOP housing 62 that fluidly couple one of the multiple ports 110 to the inlets 160, and FIG. 9 is taken in another plane through certain internal passageways 192 through the BOP housing 62 that fluidly couple another one of the multiple ports 110 to the inlets 170. As shown, placement of the internal passageways 190, 192 provides efficient routing of the fluid (e.g., to both of the inlets 160 at one time via one port 110; to both of the inlets 170 at one time via one port 110), as well as supports or enables the first bonnet assemblies 64 to have a same configuration (e.g., interchangeable between the first side and the second side of the BOP housing 62).

Figure 10:
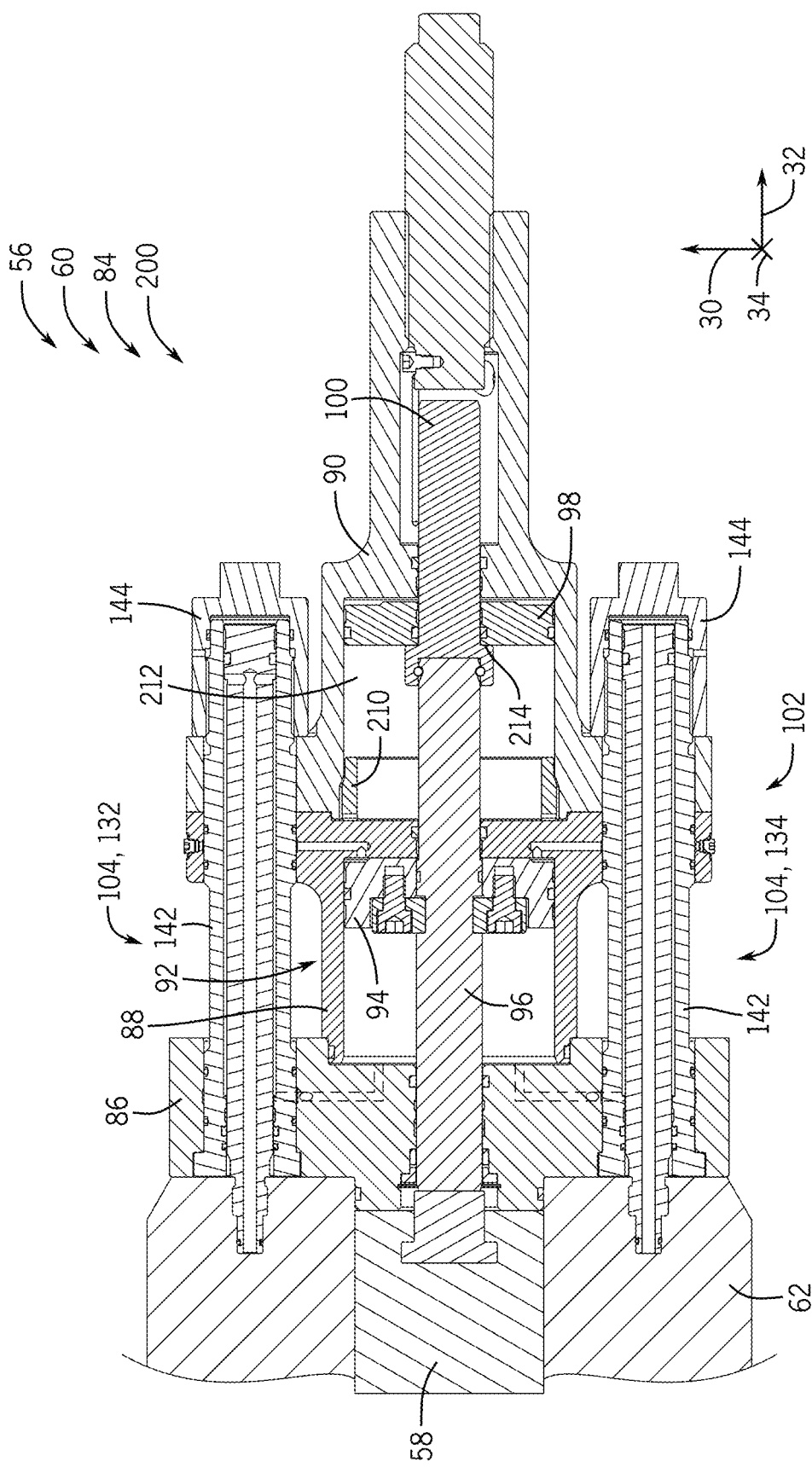
FIG. 10 is a cross-sectional view of a portion of a second BOP that may be utilized as part of the BOP stack of FIG. 1, wherein the second BOP is in an open configuration and engaged configuration, in accordance with an embodiment of the present disclosure.

FIG. 10 is a cross-sectional view of an embodiment of a portion of the second BOP 56, wherein the cross-sectional view is taken in a plane through the two ram change assemblies 104. To facilitate discussion, the two ram change assemblies are also referred to herein as the engagement ram change assembly 132 and the disengagement ram change assembly 134. In FIG. 10, the second BOP 56 is in the open configuration 60 and in the engaged configuration 200. As shown, the portion of the second BOP 56 includes one of the opposed rams 58 in the BOP housing 62, and one of the second bonnet assemblies 84 coupled to the BOP housing 62. The second bonnet assembly 84 includes the second bonnet flange 86, the second bonnet body 88, and the additional bonnet body 90. The second bonnet body 88 supports the second actuator 92, which may include the piston 94 and the connecting rod 96. The additional bonnet body 90 supports the additional piston 98 and the additional connecting rod 100 to supplement or to increase closing force applied by the second actuator 92.

As shown, the connecting rod 96 and the additional connecting rod 100 may be coupled to one another. For example, one end of the additional connecting rod 100 may include a side wall that defines an opening (e.g., recess, cup) that receives one end of the connecting rod 96. Additionally, pins may be inserted through the side wall to engage grooves formed on the one end of the connecting rod 96. In certain embodiments, a stopper 210 (e.g., annular stopper; ring) may be positioned in an additional chamber 212 to limit or to block movement of the additional piston 98 toward the second bonnet body 88. The additional piston 98 may be slidingly coupled to the additional connecting rod 100, thus the additional piston 98 may be utilized during an initial portion of a stroke (e.g., to shear the conduit in the central bore of the second BOP 56) and the additional piston 98 may be retained or blocked via the stopper 210. However, additional fluid pressure may continue to be applied to the piston 94, and advantageously both the connecting rod 96 and the additional connecting rod 100 may continue to move with the piston 94 to provide a seal across the central bore of the second BOP 56. Further, upon transition of the second BOP 56 from the closed configuration to the open configuration 60, a shoulder 214 of the additional connecting rod 100 may contact and engage the additional piston 98 to carry the additional piston 98 through the additional chamber 212 to enable the second BOP 56 to reach the open configuration 60. In this way, a tandem configuration for the second BOP 56 may provide additional force (e.g., during the initial portion of the stroke) and may be used in conjunction with the ram change system 102 that operates as described with reference to FIGS. 2-9.

As described and shown in FIG. 2, the second BOP 56 may include the pressure valves 106, which may expose a portion of the additional chamber 212 to atmosphere (e.g., ambient or surround air) to allow fluid (e.g., air) to pass across the pressure valves 106 to facilitate transition of the second BOP 56 to the open configuration 60. For example, as the fluid is not provided to the additional chamber 212 to drive the additional piston 98 to transition the second BOP to the open configuration 60 (e.g., to reduce seals, reduce fluid volume, and/or provide compact design), the pressure valves 106 may enable air flow in and/or out of the additional chamber 212 as the additional piston 98 moves within the additional chamber 212.

As shown, the second bonnet body 88 may be formed as one piece and the additional bonnet body 90 may be formed as one piece. Further, the second bonnet flange 86, the second bonnet body 88, and the additional bonnet body 90 may be held together (e.g., in contact with one another) via the ram change assemblies 104. For example, the ram change cylinders 142 and the ram change end caps 144 hold the second bonnet flange 86, the second bonnet body 88, and the additional bonnet body 90 together (e.g., block separation along the axial axis 32). Further, as shown, the engagement ram change assembly 132 and the disengagement ram change assembly 134 also pass through or extend through openings of the second bonnet flange 86, the second bonnet body 88, and the additional bonnet body 90. Advantageously, this structure may be utilized instead of additional fasteners (e.g., bolts) to hold the second bonnet flange 86, the second bonnet body 88, and the additional bonnet body 90 together. However, it should be appreciated that fasteners may be implemented in certain cases.

Figure 11:
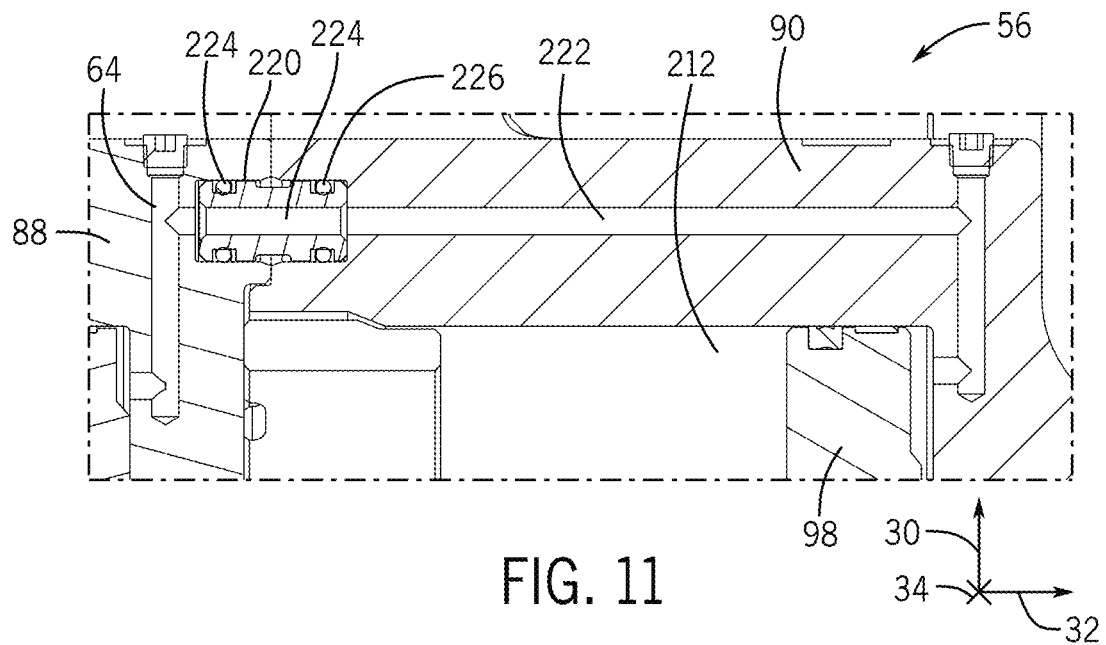
FIG. 11 is a cross-sectional view of a portion of the second BOP of FIG. 10, wherein a seal sub forms part of a fluid path, in accordance with an embodiment of the present disclosure.

It should be appreciated that additional bonnet fluid passageways may be provided for the second BOP 56. For example, FIG. 11 is a cross-sectional view of an embodiment of a portion of the second BOP 56 with a seal sub 220 positioned along an additional bonnet passageway 222 that may be considered part or be fluidly coupled to the bonnet fluid passageways 164. In particular, the seal sub 220 is positioned between the second bonnet body 88 and the additional bonnet body 90 to facilitate flow of the fluid to the additional chamber 212 with the additional piston 98. As shown, the seal sub 220 is seated or positioned within counterbores formed in the second bonnet body 88 and the additional bonnet body 90, and the seal sub 220 provides a connecting passage 224 and multiple seals 226 (e.g., annular seals; o-rings). Indeed, it should be appreciated that additional seal subs may be positioned to provide sealing to facilitate use of any combination of the bonnet fluid passageways and additional bonnet fluid passageways to facilitate techniques described herein.

Figure 12:
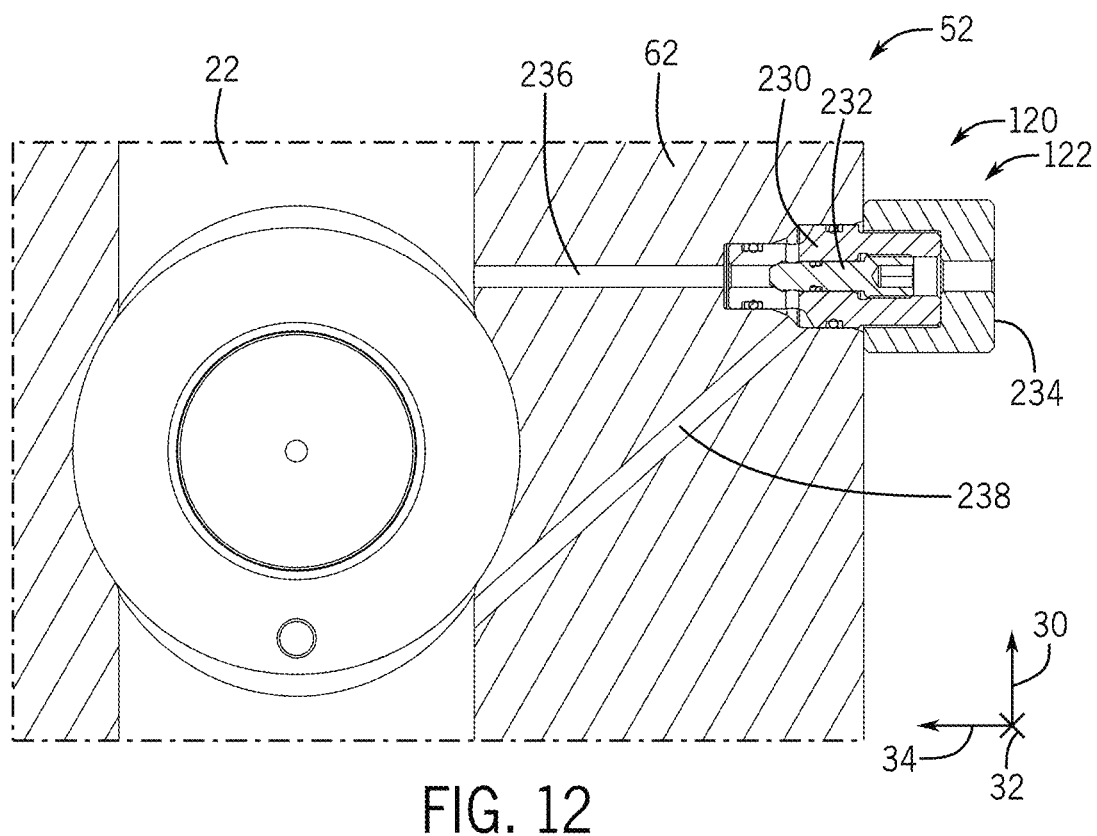
FIG. 12 is a cross-sectional end view of a portion of a BOP, such as the first BOP of FIG. 5, that may be utilized as part of the BOP stack of FIG. 1, wherein the BOP includes a pressure equalizing valve assembly, in accordance with an embodiment of the present disclosure.

FIG. 12 is a cross-sectional end view of an embodiment of a portion of the first BOP 52 with one of the multiple pressure equalizing valve assemblies 120. As described herein, the pressure equalizing valve assembly 120 is provided to facilitate pressure equalization under certain conditions and/or at certain times (e.g., prior to transition of the first BOP 52 from the closed configuration to the open configuration).

As shown, the pressure equalizing valve assembly 120 includes one of the multiple pressure equalizing subs 122, which includes a valve body 230, a valve plug 232, and a lock plate 234. As shown, the valve body 230 includes a valve opening that supports the valve plug 232. In certain embodiments, the valve body 230 includes the valve opening that is threadably coupled to the valve plug 232, and thus rotation of the valve plug 232 relative to the valve body 230 causes the valve plug 232 to move laterally along the valve body 230. In this way, the valve plug 232 may close and open the pressure equalizing valve assembly 120 (e.g., close and open metal-to-metal seals between the valve plug 232 and the valve body 230), or more specifically, may block and enable fluid to flow between a first equalizing internal passage 236 formed in the BOP housing 62 and a second equalizing internal passage 238 formed in the BOP housing 62 via the valve body 230.

It should be appreciated that the first equalizing internal passage 236 formed in the BOP housing 62 may fluidly couple the central bore 22 above an interface (e.g., seal) formed between the opposed rams of the first BOP 52 relative to the vertical axis 30 to the valve opening of the valve body 230, and the second equalizing internal passage 238 formed in the BOP housing 62 may fluidly couple the central bore 22 below the interface formed between the opposed rams of the first BOP 52 relative to the vertical axis 30 to the valve opening of the valve body 230. In this way, the pressure equalizing valve assembly 120 enables selective fluid coupling of the central bore 22 above and below the interface formed between the opposed rams of the first BOP 52 relative to the vertical axis 30 (e.g., via operation of the pressure equalizing valve assembly 120, such as by adjusting the valve plug 232 within the valve body 230).

As described herein, it may be desirable to relieve or to equalize pressure by opening the pressure equalizing valve assembly 120 at certain times, such as while the first BOP 52 is in the closed configuration and prior to adjusting the first BOP 52 to the open configuration. Further, as described herein with reference to FIGS. 3 and 12, the multiple pressure equalizing subs 122 may facilitate maintenance operations. For example, if one of the multiple pressure equalizing valve assemblies 120 is damaged, this may be addressed by replacing one of the multiple pressure equalizing subs 122 instead of an entirety of the BOP housing 62.

Figure 13:
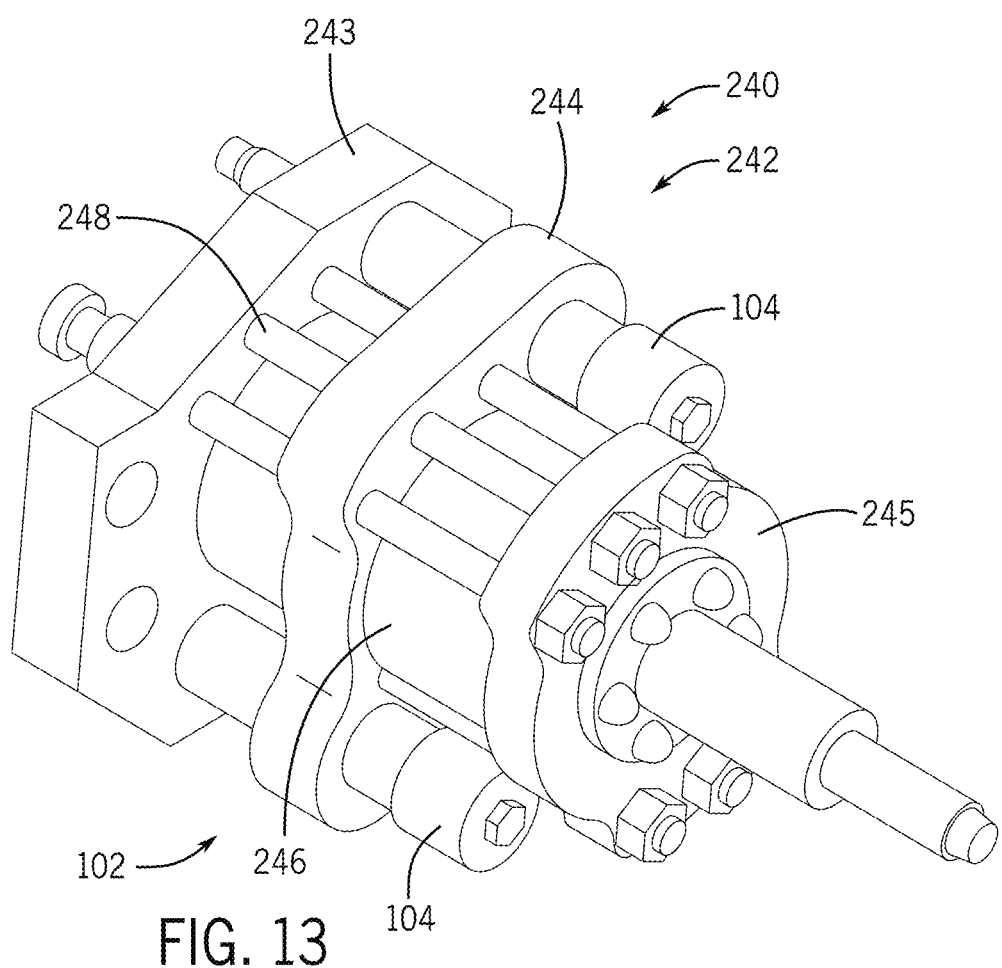
FIG. 13 is a perspective view of a portion of a BOP that may be utilized as part of the BOP stack of FIG. 1, wherein the BOP includes a multi-piece bonnet body with bonnet fasteners, in accordance with an embodiment of the present disclosure.

FIG. 13 is a perspective view of an embodiment of a portion of a BOP 240 that may be utilized as part of the BOP stack 12 of FIG. 1, wherein the BOP 240 includes a multi-piece bonnet body. In particular, a bonnet 242 may include a bonnet flange 243 and the multi-piece bonnet body formed with a first bonnet body portion 244, a second bonnet body portion 245, and a bonnet chamber portion 246. As shown, the bonnet flange 243, the first bonnet body portion 244, and the second bonnet body portion 245 are coupled together via bonnet fasteners 248 (e.g., threaded fasteners, such as bolts). The ram change system 102 with the multiple ram change assemblies 104 may be utilized with the BOP 240. Thus, while certain advantages may be realized via one-piece bonnet bodies and certain structural features (e.g., the multiple ram change assemblies 104 that may be employed in place of bonnet fasteners and that operate as bonnet fasteners to hold the bonnet flange to the bonnet body together) shown and described in FIGS. 2-11, it should be appreciated that the ram change system 102 with the multiple ram change assemblies 104 may be utilized with any of a variety of BOPs having any of a variety of features.

It should be appreciated that at least some operations described herein may be carried out in an automated manner (e.g., without human operator intervention) and/or in a remote manner (e.g., via control signals provided from a remote location, wherein the remote location may be out of sight from and/or out of reach from the BOP stack 12, at a remote distance of many meters, kilometers, or more from the BOP stack 12, and so forth). For example, FIG. 14 is a schematic diagram of an embodiment of a control system 250 that may be utilized to control at least certain features of the BOP stack 12.

Figure 14:
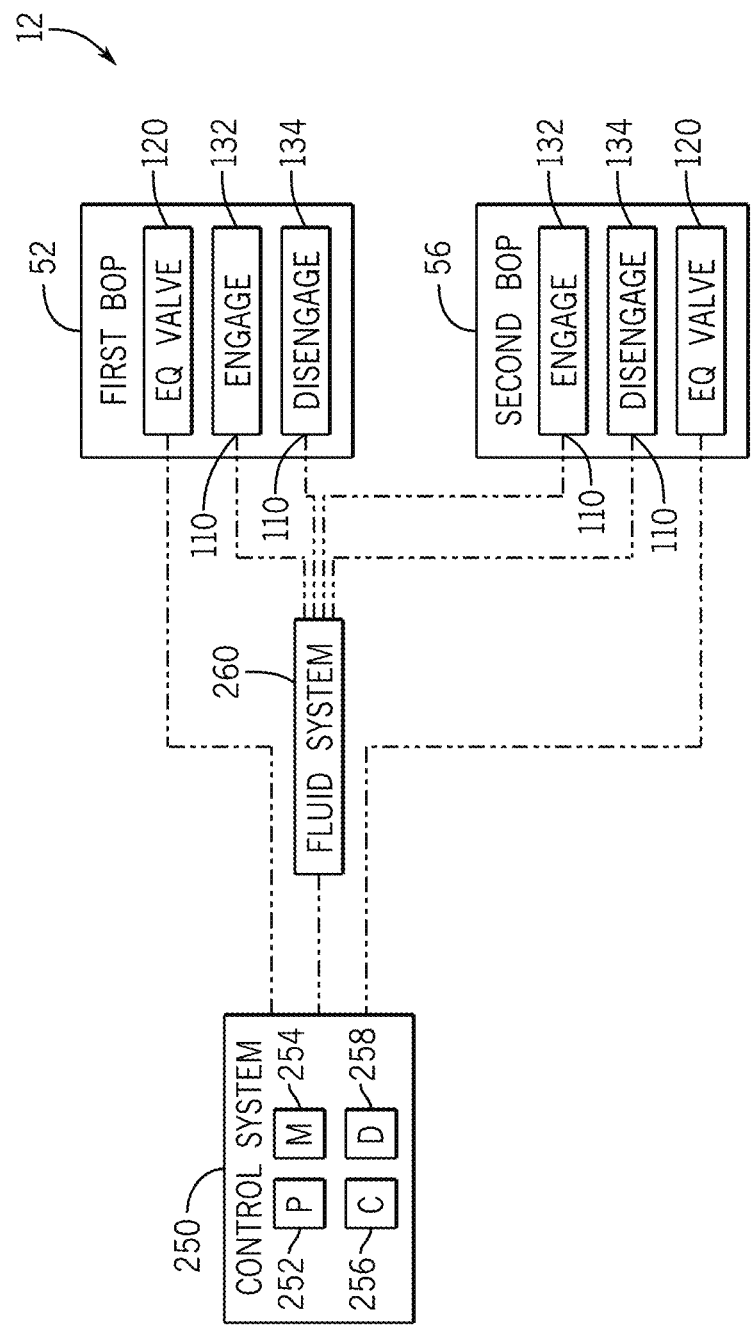
FIG. 14 is a block diagram of a control system that may be utilized to control features of the BOP stack of FIG. 1, in accordance with an embodiment of the present disclosure.

As shown in FIG. 14, the control system 250 includes a processor 252 and a memory device 254. The control system 250 may also include a communication device 256 (e.g., transceiver), an output device 258 (e.g., display), and/or other components. The control system 250 may control a fluid system 260 (e.g., with a hydraulic fluid source, pumps, manifolds, valves, and/or conduits) to control movement of components of the BOP stack 12. It should be appreciated that at least some components of the fluid system 260 (e.g., the hydraulic fluid source, the pumps, the manifolds, the valves, and/or the conduits) may be at a remote location from the BOP stack 12.

For example, the control system 250 may control the fluid system 260 to provide the fluid to the multiple ports 110, such as to a particular one of the multiple ports 110 to cause open, close, engage, or disengage operations. As one specific example, with securement via the one or more fasteners 130 of FIG. 3, the control system 250 may control the fluid system 260 to provide the fluid to one of the multiple ports 110 that is fluidly coupled to the engagement ram change assembly 132 of the first BOP 52 to cause first BOP 52 to transition to or be in the open configuration 60, as shown in FIG. 5. As another specific example, with securement via the one or more fasteners 130 of FIG. 3, the control system 250 may control the fluid system 260 to provide the fluid to another one of the multiple ports 110 that is fluidly coupled to the disengagement ram change assembly 134 of the first BOP 52 to cause first BOP 52 to transition to or be in the closed configuration.

Further, as noted herein, without securement via the one or more fasteners 130 of FIG. 3, the control system 250 may control the fluid system 260 to provide the fluid to one of the multiple ports 110 that is fluidly coupled to the engagement ram change assembly 132 of the first BOP 52 to cause the first bonnet assembly 64 to separate or disengage from the BOP housing 62, as shown in FIG. 7. As another specific example, without securement via the one or more fasteners 130 of FIG. 3, the control system 250 may control the fluid system 260 to provide the fluid to another one of the multiple ports 110 that is fluidly coupled to the disengagement ram change assembly 134 of the first BOP 52 to cause the first bonnet assembly 64 to contact and engage the BOP housing 62, as shown in FIG. 5.

It should be appreciated that the control system 250 may control the fluid system 260 to provide the fluid to respective ports 110 of the second BOP 56 in a similar manner. Further, it should be appreciated that the control system 250 may control the fluid system 260 to provide the fluid to respective ports 110 of the first BOP 52 and the second BOP 56 at a same time or at different times. Additionally, the control system 250 may provide control signals to operate the pressure equalization valve assembly 120. For example, the control system 250 may provide control signals to an actuator that drives (e.g., rotates; moves) the valve plug 232 within the valve body 230, as shown in FIGS. 12 and 13.

The processor 252 may be processing circuitry that includes one or more processors configured to execute software, such as software for processing signals (e.g., indicative of a pressure in the central bore of the BOP stack 12), inputs (e.g., keyed inputs from the operator), and/or controlling components of the BOP stack 12 (e.g., via the fluid system 260). The memory device 254 may include one or more memory devices (e.g., a volatile memory, such as random access memory [RAM], and/or a nonvolatile memory, such as read-only memory [ROM]) that may store a variety of information and may be used for various purposes. For example, the memory device 254 may store processor-executable instructions (e.g., firmware or software) for the processor 252 to execute, such as instructions for processing signals and/or controlling components of the BOP stack 12 (e.g., via the fluid system 260). The communication device 256 may be configured to transmit signals (e.g., data, information, control signals) via wireless and/or wired protocols. Further, the output device 258 may be configured to display information (e.g., data, information, status indicators) for visualization by the operator, provide audible alarms, and so forth. For example, the output device 258 may present indications of a current configuration (e.g., open, closed, engaged, disengaged) of the first BOP 52 and the second BOP 56 (e.g., each BOP) in the BOP stack 12.

It should be appreciated that the control system 250 may be a dedicated and/or contained controller with processing circuitry that carries out the various techniques disclosed herein. However, the control system 250 may be part of and/or include a distributed controller with processing circuitry that carries out the various techniques disclosed herein. Thus, while certain operations are described as being performed by the control system 250 to facilitate discussion, it should be appreciated that the various techniques disclosed herein may be performed by any suitable device and/or distributed between any suitable combination of devices in any suitable manner.

Embodiments described herein may have various additional advantages and features. For example, at least certain components may be manufactured via additive manufacturing (e.g., three-dimensional printing) to form passageways (e.g., the internal passageways 190, 192; the bonnet fluid passageways 164); however, it should be appreciated that the passageways may be formed via machining (e.g., drilling) into structures (e.g., the BOP housing 62; the bonnet flanges 66, 86). Further, additive manufacturing may facilitate or provide efficient manufacturing of the bonnet bodies and the additional bonnet bodies (e.g., each of the bonnet bodies 68, 88 as one-piece structures; each of the additional bonnet bodies 90 as one-piece structures); however, it should also be appreciated that such components may be manufactured via any suitable manufacturing techniques (e.g., casting).

Embodiments described herein provide shared ports (e.g., the multiple ports 110) for multiple functions (e.g., open/ engage, close/disengage), and thus may enable use of fewer hoses compared to certain existing systems. Embodiments described herein provide advantages with respect to ability to operate at least some steps for the multiple functions remotely (e.g., via the control system 250). Additionally, it should be appreciated that embodiments described herein may be implemented in any of a variety of contexts, such as during intervention operations, drilling operations, and/or other operations. Further, embodiments described herein may be implemented in land-based systems, offshore systems, subsea systems, and so forth. As described herein, the embodiments may be utilized with or include any suitable type of BOP and/or with any suitable type of rams, such as shear, slip, blind seal, pipe seal, and/or any combination thereof (including combi BOPs).

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. Indeed, the features shown and described with reference to FIGS. 1-14 may be combined in any suitable manner. Additionally, the features shown and described may be utilized in any of a variety of systems and/or contexts, such in drilling systems during drilling operations. Furthermore, numerical terms, such as "first," "second," and "third" are used to distinguish components to facilitate discussion, and it should be appreciated that the numerical terms may be used differently or assigned to different elements in the claims.

The invention claimed is:

1. A blowout preventer (BOP), comprising:
   a BOP housing;
   a bonnet housing comprising a bonnet flange and a bonnet body with an actuator configured to drive a ram within the BOP housing; and
   a plurality of ram change assemblies configured to drive the bonnet housing toward and away from the BOP housing and to couple the bonnet flange to the bonnet body,
   wherein each ram change assembly of the plurality of ram change assemblies comprises opposed surfaces that contact the bonnet flange and the bonnet body to couple the bonnet flange to the bonnet body.

2. The BOP of claim 1, wherein the opposed surfaces comprise a shoulder of a ram change cylinder and an end surface of a ram change end cap.

3. The BOP of claim 2, wherein the ram change cylinder and the ram change end cap are coupled to one another via a threaded interface.

4. The BOP of claim 1, wherein each ram change assembly of the plurality of ram change assemblies comprises:
   a ram change cylinder;
   a ram change end cap; and a ram change piston, wherein a respective first end portion of the ram change piston is configured to mount to the BOP housing via a threaded interface.

5. The BOP of claim 1, wherein the plurality of ram change assemblies define a first fluid passageway that provides fluid to a portion of a chamber within the bonnet body to cause the actuator to drive the ram to transition the BOP to a closed configuration with the BOP housing secured to the bonnet flange via one or more BOP fasteners, and that provides fluid to one or more spaces defined within the plurality of ram change assemblies to drive the bonnet housing away from the BOP housing without the BOP housing secured to the bonnet flange via the one or more BOP fasteners.

6. The BOP of claim 5, comprising a first sub with a first port coupled to the first fluid passageway, wherein the first sub is mounted to the BOP housing via one or more fasteners.

7. The BOP of claim 1, comprising a pressure equalization valve assembly with a valve body coupled to the BOP housing and a valve plug configured to move relative to the valve body to fluidly couple a first fluid path formed in the BOP housing and exposed to a first space vertically above the ram within the BOP housing to a second fluid path formed in the BOP housing and exposed to a second space vertically below the ram within the BOP housing.

8. The BOP of claim 1, wherein the plurality of ram change assemblies comprises a first ram change assembly and a second ram change assembly offset from one another along a vertical axis and a lateral axis.

9. The BOP of claim 1, wherein the bonnet housing and the plurality of ram change assemblies form a first bonnet assembly coupled to a first side of the BOP, the BOP comprises another bonnet housing and another plurality of ram change assemblies that form a second bonnet assembly coupled to a second side of the BOP, and the first bonnet assembly and the second bonnet assembly have a same configuration.

10. The BOP of claim 1, comprising:
a fluid system comprising a fluid source and a valve; and
a control system configured to provide control signals to control the valve to enable a flow of fluid from the fluid source to at least one of the plurality of ram change assemblies.

11. A method of operating the BOP of claim 1, the method comprising:
coupling the bonnet flange and the bonnet body together via the plurality of ram change assemblies; and
providing fluid to a disengagement ram change assembly of the plurality of ram change assemblies to drive the bonnet flange and the bonnet body away from the BOP housing of the BOP.

12. A blowout preventer (BOP), comprising:
a BOP housing;
a bonnet housing comprising a bonnet flange and a bonnet body with an actuator configured to drive a ram within the BOP housing; and
a plurality of ram change assemblies configured to drive the bonnet housing toward and away from the BOP housing and to couple the bonnet flange to the bonnet body,
wherein the bonnet housing comprises an additional bonnet body with an additional actuator configured to provide a supplemental force to drive the ram within the BOP housing to transition the BOP to a closed configuration, and
wherein each ram change assembly of the plurality of ram change assemblies comprises opposed surfaces that contact the bonnet flange and the additional bonnet body to couple the bonnet flange, the bonnet body, and the additional bonnet body to one another.

13. The BOP of claim 12, wherein the actuator comprises a piston and a connecting rod, the additional actuator comprises an additional piston and an additional connecting rod, the connecting rod is coupled to the additional connecting rod, and a stop ring within the additional bonnet body is configured to block movement of the additional piston and enable movement of the additional connecting rod relative to the additional piston and toward the BOP housing to transition the BOP to the closed configuration.

14. The BOP of claim 12, wherein the additional actuator comprises an additional piston, the additional bonnet body defines a chamber that houses the additional piston, and a portion of the chamber between the additional piston and the BOP housing is exposed to atmosphere via a valve.

15. A blowout preventer (BOP), comprising:
a bonnet flange;
a bonnet body that houses an actuator; and
a plurality of ram change assemblies, wherein each ram change assembly of the plurality of ram change assemblies comprises a ram change cylinder that engages the bonnet flange and a ram change end cap that engages the bonnet body to block movement of the bonnet flange relative to the bonnet body along an axial axis.

16. The BOP of claim 15, wherein the bonnet body comprises a one-piece structure.

17. The BOP of claim 16, wherein the ram change cylinder extends through respective openings formed in the bonnet body.

18. The BOP of claim 15, wherein the ram change cylinder comprises an anti-rotation feature to block rotation of the ram change cylinder relative to the bonnet flange.

* * * * *